(12) United States Patent
Meagher

(10) Patent No.: US 7,476,891 B2
(45) Date of Patent: Jan. 13, 2009

(54) FAULT DETECTION METHOD AND APPARATUS

(75) Inventor: Thomas Bruce Meagher, Houston, TX (US)

(73) Assignee: ICS Triplex Technology, Ltd., Maldon (GB)

( * ) Notice: Subject to any disclaimer, the term of this patent is extended or adjusted under 35 U.S.C. 154(b) by 0 days.

(21) Appl. No.: 11/689,254

(22) Filed: Mar. 21, 2007

(65) Prior Publication Data

US 2008/0035833 A1    Feb. 14, 2008

Related U.S. Application Data

(60) Provisional application No. 60/785,537, filed on Mar. 24, 2006.

(51) Int. Cl.
    *G01R 27/08*    (2006.01)
(52) U.S. Cl. .................. 250/551; 250/214 SW
(58) Field of Classification Search .......... 250/221, 250/229, 214 R, 214 SW; 327/298, 318, 327/409, 514, 515; 257/82–84
    See application file for complete search history.

(56) References Cited

U.S. PATENT DOCUMENTS

| | | | |
|---|---|---|---|
| 4,504,974 A * | 3/1985 | Rademaker | 398/115 |
| 4,535,378 A | 8/1985 | Endo et al. | |
| 4,539,683 A | 9/1985 | Hahn et al. | |
| 4,679,028 A | 7/1987 | Wilson | |
| 5,089,948 A * | 2/1992 | Brown et al. | 363/58 |
| 5,128,625 A | 7/1992 | Yatsuzuka et al. | |
| 5,293,082 A | 3/1994 | Bathaee | |
| 5,324,989 A | 6/1994 | Thornton et al. | |
| 5,552,881 A | 9/1996 | Jezwinski et al. | |
| 5,594,439 A | 1/1997 | Swanson | |
| 5,621,603 A | 4/1997 | Adamec et al. | |
| 5,774,321 A | 6/1998 | Kim et al. | |
| 5,867,014 A | 2/1999 | Wrathall et al. | |
| 5,896,263 A | 4/1999 | Terdan et al. | |
| 5,909,660 A | 6/1999 | Foote et al. | |

(Continued)

FOREIGN PATENT DOCUMENTS

DE    19750349    5/1998

(Continued)

OTHER PUBLICATIONS

European Search Report for European Application 06114802.9, Sep. 5, 2006, European Patent Office.

(Continued)

*Primary Examiner*—Georgia Y Epps
*Assistant Examiner*—Tony Ko
(74) *Attorney, Agent, or Firm*—Boyle Fredrickson, S.C.; William R. Walbrun

(57) ABSTRACT

This invention relates to fault detection in electrical circuits. The invention provides an input module for electrically isolating an input signal received via a field sensor to be transmitted to a plurality of processors, in which the input module comprises a plurality of optical coupler/controller circuits; and each optical coupler/controller comprises a light emitting diode drive sub-circuit driving a light emitting diode; and an input sub-circuit; and in which a sensor voltage representing said input signal and a supply voltage are connected to each input sub-circuit; and each of said light emitting diode drive sub-circuits are connected in series between the supply voltage and ground.

6 Claims, 3 Drawing Sheets

U.S. PATENT DOCUMENTS

| | | | |
|---|---|---|---|
| 6,061,006 A | 5/2000 | Hopkins et al. |
| 6,125,024 A | 9/2000 | LeComte et al. |
| 6,320,283 B1 | 11/2001 | Salim et al. |
| 6,351,835 B1 | 2/2002 | Sakaguchi |
| 6,400,163 B1 | 6/2002 | Melcher et al. |
| 6,459,599 B1 | 10/2002 | Agirmann et al. |
| 6,557,131 B1 | 4/2003 | Arabi |
| 6,594,129 B1 | 7/2003 | Baba et al. |
| 6,653,963 B1 | 11/2003 | Barrenscheen et al. |
| 6,657,464 B1 | 12/2003 | Balardeta et al. |
| 6,768,350 B1 | 7/2004 | Dickey |
| 2003/0043521 A1 | 3/2003 | Thiele |
| 2003/0063679 A1 | 4/2003 | Scrofano |
| 2004/0125007 A1 | 7/2004 | Pezzini |
| 2005/0135037 A1 | 6/2005 | Thiery et al. |
| 2005/0154945 A1 | 7/2005 | Haag et al. |
| 2005/0174273 A1 | 8/2005 | Luo et al. |
| 2005/0248477 A1 | 11/2005 | Jongsma et al. |
| 2006/0061303 A1 | 3/2006 | Hitoshi et al. |

FOREIGN PATENT DOCUMENTS

| | | |
|---|---|---|
| EP | 0325786 | 8/1989 |
| EP | 0789458 | 8/1997 |
| EP | 1322139 | 6/2003 |
| EP | 1545163 | 6/2005 |
| JP | 55096708 | 7/1980 |
| JP | 60236073 | 1/1985 |
| JP | 08023244 | 1/1996 |
| WO | WO 03107019 | 12/2003 |

OTHER PUBLICATIONS

European Search Report for European Application 06114803.7, Sep. 1, 2006, European Patent Office.

European Search Report for European Application 06114806.0, Aug. 30, 2006, European Patent Office.

European Search Report for European Application 06114800.3, Sep. 1, 2006, European Patent Office.

European Search Report for European Application 06114804.5, Aug. 18, 2006, European Patent Office.

European Search Report for European Application 06114805.2, Aug. 24, 2006, European Patent Office.

European Search Report for European Application 06114801.1, Sep. 11, 2006, European Patent Office.

Sigma-Delta-ADC in Software, Design&Elektronik, Product Brochure, 1998, pp. 1-18, XP002398239.

* cited by examiner

FAULT DETECTION METHOD AND APPARATUS

CROSS-REFERENCE TO RELATED APPLICATIONS

This application is related to and claims priority from U.S. Provisional Application No. 60/785,537 filed Mar. 24, 2006 entitled Fault Detection and Apparatus, which is incorporated fully herein by reference.

BACKGROUND

Field of the Invention

This invention relates to fault detection in electrical circuits.

In safety control systems, fault tolerance is of utmost importance. Fault tolerance is the ability to continue functioning in the event of one or more failures within the system.

Fault tolerance may be achieved by a number of different techniques, each with its specific advantages and disadvantages. One example of fault tolerance is known as Hardware Implemented Fault Tolerance (HIFT). HIFT means that the system relies on robust hardware circuits (as opposed to complex software algorithms) to perform the fault detection and redundancy management functions. A significant advantage HIFT has over software-implemented fault tolerance is that HIFT eliminates the overhead for communications between processors, leaving more time for controlling the process. This makes HIFT systems significantly faster and more dependable than systems using software-implemented fault tolerance.

An example of a HIFT system is a system which provides redundancy, in particular Triple Modular Redundancy (TMR). Using TMR, critical circuits are triplicated and perform identical functions simultaneously and independently. The data output from each of the three circuits is voted in a majority-voting circuit, before affecting the system's outputs. If one of the triplicated circuits fails, its data output is ignored. However, the system continues to output to the process the value (voltage, current level, or discrete output state) that agrees with the majority of the functional circuits. TMR provides continuous, predictable operation.

HIFT and TMR provides for automatic fault recovery with no disruption to system operation and ensures minimal fault detection periods.

Another approach to fault tolerance is the use of hot-standby modules. This approach provides a level of fault tolerance whereby the standby module maintains system operation in the event of module failure. With this approach there may be some disruption to system operation during the changeover period if the modules are not themselves fault-tolerant.

Fault tolerant systems ideally create a Fault Containment Region (FCR) to ensure that a fault within the FCR boundary does not propagate to the remainder of the system. This enables multiple faults to co-exist on different parts of a system without affecting operation.

Fault tolerant systems generally employ dedicated hardware and software test and diagnostic regimes that provide very fast fault recognition and response times to provide a safer system.

Commonly, it is possible to repair faults without interrupting system operation (known as hot replacement). For example active and standby module may operate in parallel so that if an active module becomes faulty there is an automatic change over to a standby module.

Safety control systems are generally designed to be 'fail-operational/fail-safe'. Fail operational means that when a failure occurs, the system continues to operate: it is in a fail-operational state. The system should continue to operate in this state until the failed module is replaced and the system is returned to a fully operational state.

An example of fail safe operation occurs, for example if, in a TMR system, a failed module is not replaced before a second failure in a parallel circuit occurs, the second failure should cause the TMR system to shut down to a fail-safe state.

Typical safety control applications include emergency and safety shutdown systems, process control, reactor control, wellhead control, turbine and compressor control, fire and gas detection and abatement, and are applicable to many industries including oil and gas production and refining, chemical production and processing, power generation, paper and textile mills and sewage treatment plants.

A common method of transmitting sensor information in many industrial process control or monitoring applications is using a 4-20 mA current loop. Transmitting sensor information via a current loop is particularly useful when the information has to be sent to a remote location over long distances. A sensor's output voltage is converted to a proportional current, with 4 mA usually representing the sensor's zero-level output and with 20 mA representing the sensor's full-scale output. A receiver at the remote end converts the 4-20 mA current back into a voltage.

Transmitting the information via a current loop has the advantage that the magnitude of the current in the loop is not affected by voltage drops which occur due to impedances in the interconnecting wires.

The input signals are electrically isolated from the process monitor or control circuits, for example, by the use of optical couplers.

This invention provides an improved input circuit using optical couplers for use in a fault tolerant architecture utilising redundancy (replicated circuits) which provides a high degree of fault tolerance, low power consumption, and accuracy.

There are three main issues involved in the fault tolerant design of the input circuit Because the input circuit serves as a purely analogue front end the diagnostic fault coverage is limited The input circuit is therefore designed to provide defence against latent faults where they exist.

SUMMARY OF THE INVENTION

According to the invention there is provided an input module for electrically isolating an input signal received via a field sensor to be transmitted to a plurality of processors, in which the input module comprises a plurality of optical coupler/controller circuits; and each optical coupler/controller comprises a light emitting diode drive sub-circuit driving a light emitting diode; and an input sub-circuit; and in which a sensor voltage representing said input signal and a supply voltage are connected to each input sub-circuit; and each of said light emitting diode drive sub-circuits are connected in series between the supply voltage and ground.

Preferably a sensor current indicative of a sensor value generated by said field sensor is used to generate said supply voltage as well as said sensor voltage.

In a preferred embodiment, the light emitting diode is coupled to a feedback photodiode and to an output photodiode.

Preferably, the feedback photodiode connects to a control amplifier to control a drive transistor which drives the light emitting diode.

In a preferred embodiment, the light emitting diode drive sub-circuit further comprises one or more Zener diodes in parallel with said light emitting diode.

Preferably, the supply voltage is connected to the input sub-circuit via a series of resistors.

BRIEF DESCRIPTION OF THE DRAWINGS

The invention will now be described, by way of example only, with reference to the accompanying drawings in which.

DETAILED DESCRIPTION

Figure 1:
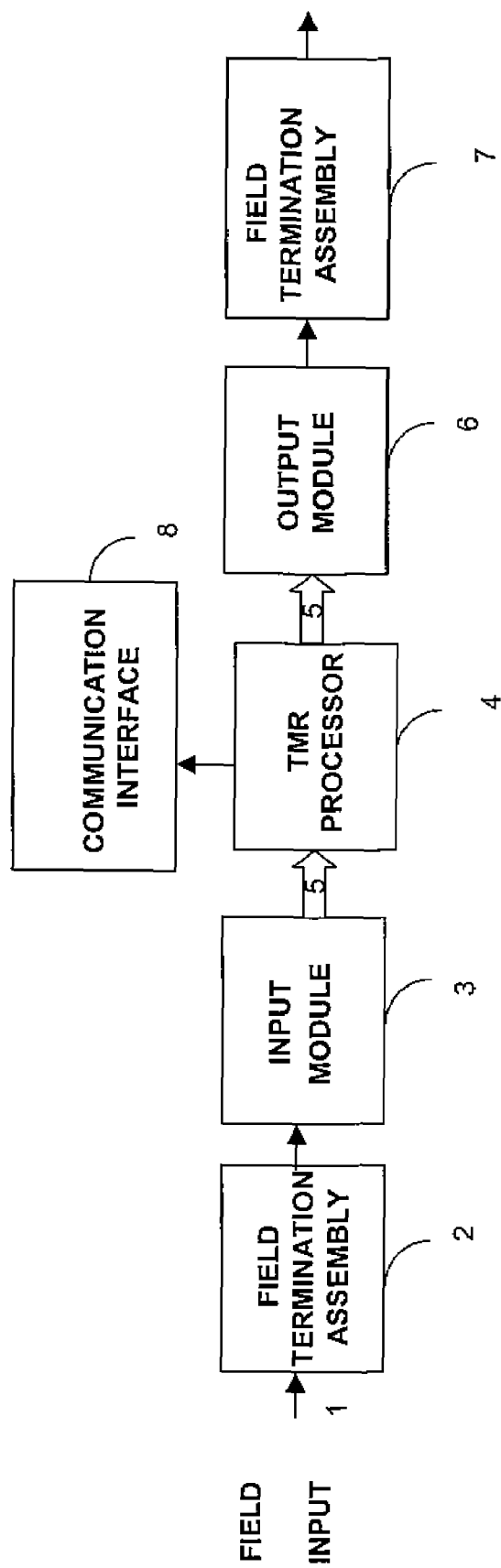
FIG. 1 illustrates schematically a fault tolerant architecture.

Referring now to FIG. 1, signals 1 from an input field device (not shown) are connected to the system via an input Field Termination Assembly (FTA) 2. An input 3 module receives buffers and carries out any necessary conversion of the input data from the field device. The input data is then transmitted over a triplicated Inter-Module Bus (IMB) 5 to a TMR processor 4. Triplicated microprocessors of the TMR processor receive the input data from each channel of the IMB 5 and carry out a majority vote of the data. During data processing, each of the three processors compares and majority votes its input data against that of the other two processors. The processors synchronously execute the application program, and the derived output data is transmitted back to the IMB. An output module 6 receives, majority votes, and carries out any necessary conversion of the output data from the TMR processor 4. The output circuits are then driven by the majority-voted command. The output signals are connected to a field device (not shown) via an output FTA 7. A communications interface 8 provides facilities to allow systems to be networked using peer to peer communications links, the collection of Sequence of Events (SOE) data, and connection to other systems.

If an internal circuit in the system fails, it is simply voted out. Comprehensive distributed voting both out-votes failures, preventing them from being propagated into the process, and simplifies the process of identifying where faults have occurred.

Figure 2:
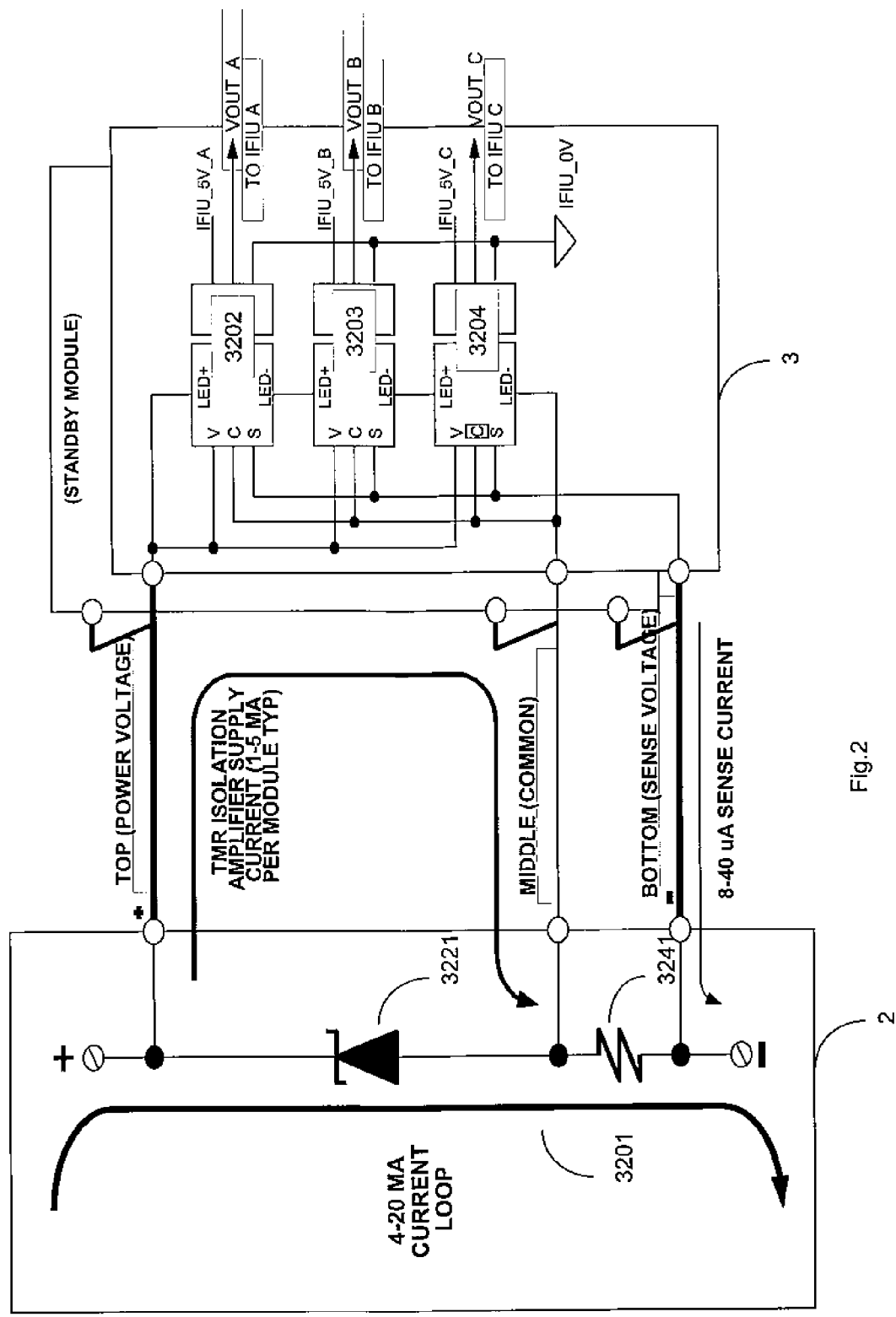
FIG. 2 illustrates part of a field termination assembly and an input module of FIG. 1 in more detail.

Referring now to FIG. 2, part of the FTA 2 and the input module 3 are illustrated in more detail. A sensor (not shown) reading is converted to a current and transmitted via a 4-20 mA current loop 3201. A Zener diode 3221 provides a relatively constant supply voltage, which is equal to 7.5V in the preferred embodiment. A sense resistor 3241, which in the preferred embodiment is 100 Ohms, will have a voltage drop across it referred to herein as the sense voltage which is proportional to the loop current and hence to the sensor signal.

Hence no additional power supplies are required by the input circuit as the supply voltage and the sense voltage are provided by the current loop 3201.

Figure 3:
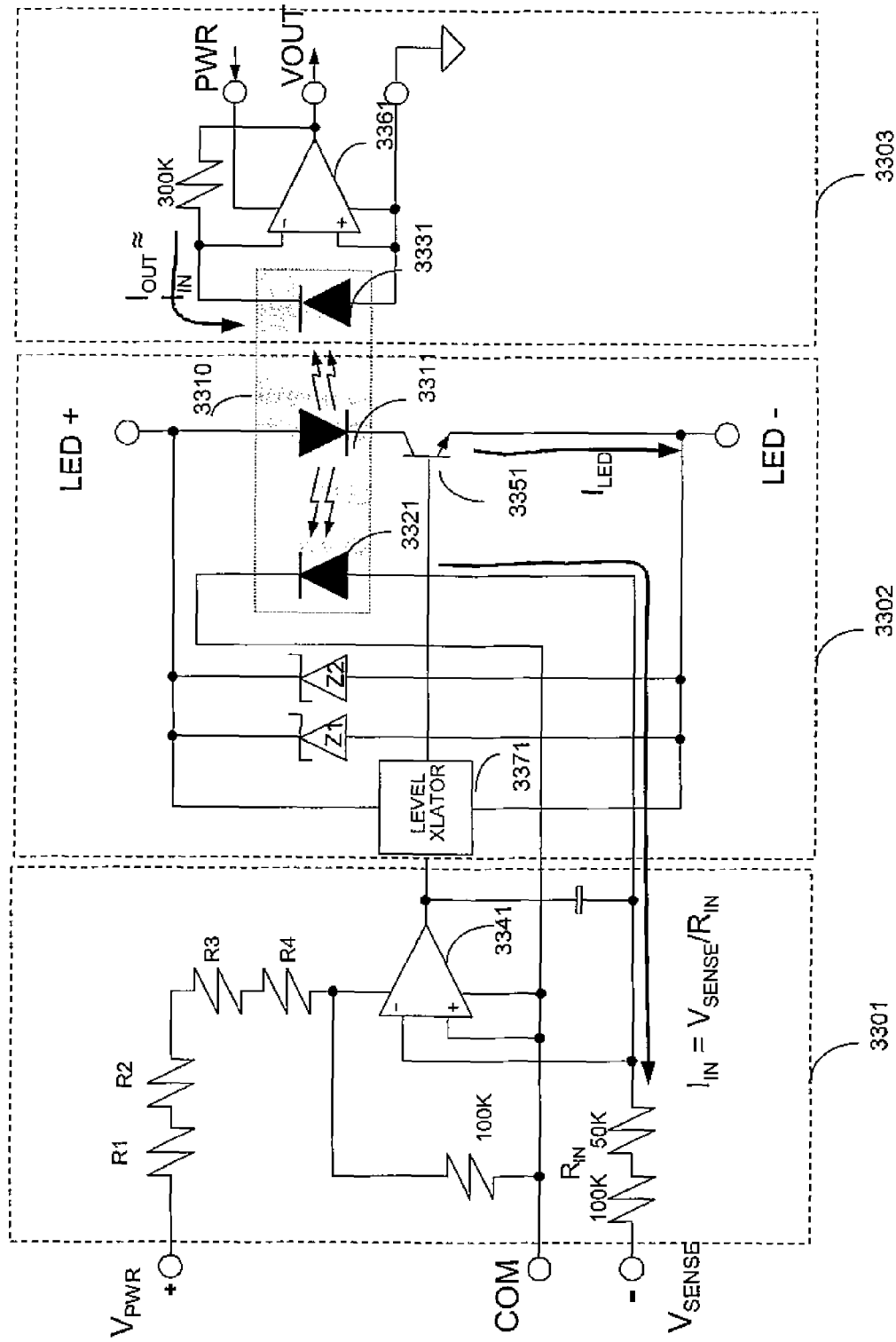
FIG. 3 illustrates an optical coupler/controller forming part of an input module of FIG. 1.

The input signals are transmitted across an electrical isolation barrier by the use of precision analogue optical couplers. The input module 3 comprises three optical coupling/control circuits 3202, 3203, 3204 which will now be described in more detail with reference to FIG. 3.

Each optical coupler/controller 3202, 3203, 3204 employs a single linear light emitting diode (LED) 3311 which couples its light signal evenly to two linear photo-diodes 3321, 3331 which are located together in the same physical package 3310. Since each of the LED/photo-diode responses are very closely matched to each other, any drift or non-linearity of the underlying LED/photo-diode coupling mechanism will be cancelled out. One photo-diode 3321, 3331 is placed on each side of the isolation barrier. The output photo-diode 3331 generates a current which is converted into a voltage for use by the TMR processor 4.

A control amplifier 3341, adjusts the current through the LED 3311 by driving a transistor 3351 in dependence upon the difference between the sense voltage and the common voltage to balance the current through the photo-diode 3321 with the input current ($V_{SENSE}/R_{IN}$). The output current from the photo-diode 3331 tracks the input current (within the tolerances of the optical coupling mechanism), and is converted to a voltage by an output buffer amplifier 3361.

The optical coupler controller 3202 is divided into three sub-circuits, an input sub-circuit 3301, an LED drive sub-circuit 3302 and an output buffer sub-circuit 3303.

The input sub-circuit 3301 is connected in parallel with the input circuits of the other optical coupler/controllers 3203, 3204. For fault tolerant operation of the parallel connected input circuits, the input circuit must be designed so that accumulated latent short circuit faults will not influence the normal operation of the other two optical couplers.

The power requirements for the input sub-circuit 3301 are so low that the power may simply be supplied via a series string of resistors R1, R2, R3, R4. In the preferred embodiment the value of each of these resistors is equal to 22 KOhm. Any three of these input resistors R1, R2, R3, R4 can fail short circuit, and the other parallel input circuits will be unaffected. Likewise the control amplifier 3341 can fail short circuit without affecting the other parallel input circuits.

The LED drive sub-circuit 3302 is connected in series with the LED drive sub-circuits of the other two optical coupler/controllers 3203, 3204. This means that the respective LED drive circuits will be operating between different reference voltage levels (LED + and LED −).

A level translator 3371 allows the input sub-circuit 3301 to operate as a single ended control amplifier 3341. The output signal from the control amplifier 3341 is shifted to between the reference voltage levels of the respective LED drive sub-circuit. The level translator 3371 and the LED drive sub-circuits are enclosed in a feedback loop, so any errors are eliminated by the control amplifier 3341. The level translator 3371 is implemented as a low-gain differential amplifier for two of the optical coupler/controllers 3203, 3204. The third optical coupler/controller 3204 requires no level translation, so the level translator is omitted The level translator 3371 is implemented by a resistor network with high resistance values, with two resistors in series to guard against latent short circuit faults.

In the circuit topology described an open circuit fault in an LED drive sub-circuit would constitute a single point of failure, hence consideration is given in the design to ensure that there are no single open-circuit faults that will influence the normal operation of the other two optical couplers. Protection against an open circuit failure by adding parallel Zener diodes Z1, Z2.

The LED drive sub-circuits for the three optical coupler/controllers 3202, 3203, 3204 are connected in series to allow each slice to use the full available current for the LED drive sub-circuits 3302. If they were in parallel, they would have to share the current and hence operate at a lower current, with unfavourable consequences for accuracy, linearity and noise.

The three terminal design of the input circuit separates the supply power and LED drive current from the total loop current that flows through the sense resistor 3241. The only portion of the loop current that does not flow through the sense resistor 3241 is due to an input resistance ($R_{IN}$) of the optical amplifier 3341 on each coupler/controller 3202, 3203, 3204. The input resistance is equal to 150 Kilohms in the preferred embodiment of the invention.

Note that optical amplifier supply current flowing through the common wire in the cable develops a small voltage drop which is in series with the sense voltage. Changes in this voltage drop constitute an error source. For example, with 10 feet of 22 AWG wire (0.017 ohm/foot) the error contribution from this source is less than 0.1% of the sensor's full-scale output.

In summary the input circuit according to the present invention provides a fault-tolerant architecture for the following reasons:

Latent Short Circuit Faults

The latent faults in the parallel input sub-circuits are likely to be short circuits in the string of resistors R1, R2, R3, R4. These faults serve only to modify the supply voltage, which has a negligible effect on the output signal. They also cause the control circuit to draw a little more current, but this increase is very small due to the high resistance values employed. To mitigate this class of faults, four series resistors are provided, and any three can be shorted without affecting the outputs of any of the other optical couplers.

Latent short circuit faults may also exist in the level translator resistor network. These faults are less problematical, because the effects are contained to the optical coupler in which they occur, and they will self-reveal when combined with another fault in the level translator.

Latent Open Circuit Faults

Latent open circuit faults in the series LED drive sub-circuits are a concern because they can accumulate to the point where the daisy chain opens up, and the whole channel is lost. To mitigate this effect, each LED drive sub-circuit contains two additional Zener diode parallel elements. To lose the whole channel, both Zener diodes would have to fail open (these are latent faults) and then the LED or the drive transistor would have to fail open.

Common Mode Faults

The input circuits must exhibit fault tolerant behaviour in stand-alone mode, and also when a hot spare is fitted in parallel 9illustrated schematically in FIG. 2. Short circuit faults on one module can reduce the shared $V_{POWER}$ supply voltage seen by the spare module.

The worst case common fault to protect against is the short circuit failure of one of the series connected LED drive sub-circuits. This fault has minimal effect on the two non-faulty LED drive sub-circuits in the faulted input module, apart from increasing the current flow through the zener diodes in the LED drive sub-circuits. However, this fault reduces the $V_{POWER}$ supply voltage of the partner module from the normal 7.5V to about 5.4V. This imposes the requirement that the LED drive sub-circuits should be able to function normally with only 5.4V to share between them, leaving only 1.8V per LED drive sub-circuit.

Similarly, if the LED or drive transistor fail open, then the series voltage across that optical coupler is increased, with a corresponding decrease for the other two optical couplers on the faulted input module.

Therefore in the preferred embodiment the input module is designed to provide normal operation with a $V_{POWER}$ supply voltage range of 5V to 8V. This voltage compliance alleviates the single point of failure performance for the input module when they are in parallel with a standby input module.

It is to be recognised that various alterations, modifications, and/or additions may be introduced into the constructions and arrangements of parts described above without departing from the scope of the present invention as defined in the following claims.

The invention claimed is:

1. An input module for electrically isolating an input signal received via a field sensor to be transmitted to a plurality of processors, in which
   the input module comprises a plurality of optical coupler/controller circuits; and
   each optical coupler/controller comprises
      a light emitting diode drive sub-circuit driving a light emitting diode; and
      an input sub-circuit; and in which
   a sensor voltage representing said input signal and a supply voltage are connected to each of said input sub-circuits; and
   each of said light emitting diode drive sub-circuits are connected in series between the supply voltage and ground and each of said input sub-circuit are connected in parallel to drive each light emitting diode drive sub-circuit.

2. An input module according to claim 1, in which a sensor current indicative of a sensor value generated by said field sensor is used to generate said supply voltage as well as said sensor voltage.

3. An input module according to claim 1, in which said light emitting diode is coupled to a feedback photodiode and to an output photodiode.

4. An input module according to claim 3, in which the feedback photodiode connects to a control amplifier to control a drive transistor which drives the light emitting diode.

5. An input module according to claim 1, in which the light emitting diode drive sub-circuit further comprises one or more Zener diodes in parallel with said light emitting diode.

6. An input module according to claim 1, in which the supply voltage is connected to the input sub-circuit via a series of resistors.

* * * * *